United States Patent [19]
Chew

[11] 3,898,785
[45] Aug. 12, 1975

[54] VACUUM OPERATED FRUIT PICKER

[76] Inventor: Clarence W. Chew, 8139 Broughton St., Sarasota, Fla. 33580

[22] Filed: Jan. 25, 1974

[21] Appl. No.: 436,682

[52] U.S. Cl. ............................................. 56/332
[51] Int. Cl.² ..................................... A01D 46/24
[58] Field of Search ................. 56/328 R, 332–338

[56] References Cited
UNITED STATES PATENTS

| 454,320 | 6/1891 | Anderson | 56/334 |
|---|---|---|---|
| 2,288,682 | 7/1942 | Chittenden | 56/334 |
| 2,545,072 | 3/1951 | Denman | 56/332 |
| 3,460,330 | 8/1969 | Black, Jr. | 56/328 R |
| 3,564,826 | 2/1971 | Middleton, Jr. | 56/328 R |
| 3,701,242 | 10/1972 | Townsend | 56/328 R |

FOREIGN PATENTS OR APPLICATIONS

| 117,078 | 2/1958 | U.S.S.R. | 56/332 |

*Primary Examiner*—Russell R. Kinsey
*Attorney, Agent, or Firm*—Clarence A. O'Brien; Harvey B. Jacobson

[57] ABSTRACT

A vacuum operated citrus picker has a picker head including a cup-shaped housing provided with a void and an opening communicating with the void. The housing opening is arranged for sealingly receiving at least a portion of a piece of citrus, and the like. The housing is attached to a rotatably mounted, rigid conduit forming a shaft mounting the picker head on an associated gathering hopper. The conduit also places the housing void in communication with a vacuum source for selectively creating a vacuum in the void. A flapper valve is arranged in the void, and has a valve element pivotally mounted on an end of the conduit for normally blocking same, with a flapper attached to the valve element for movement therewith and arranged for being contacted by an article received in the housing opening and extending into the void and pivoting the valve element to a position unblocking the conduit. This unblocking creates a sufficient vacuum in the housing void to firmly grip the article. A vacuum operated clutch arrangement responds to a predetermined vacuum in the housing void to connect the conduit to a motive source which rotates the conduit, and the housing therewith, approximately 180° from a normal or rest position. A vacuum valve associated with the conduit causes the housing void to be vented to atmosphere when the housing is so rotated, and permits the article to be dropped into the associated gathering hopper.

6 Claims, 5 Drawing Figures

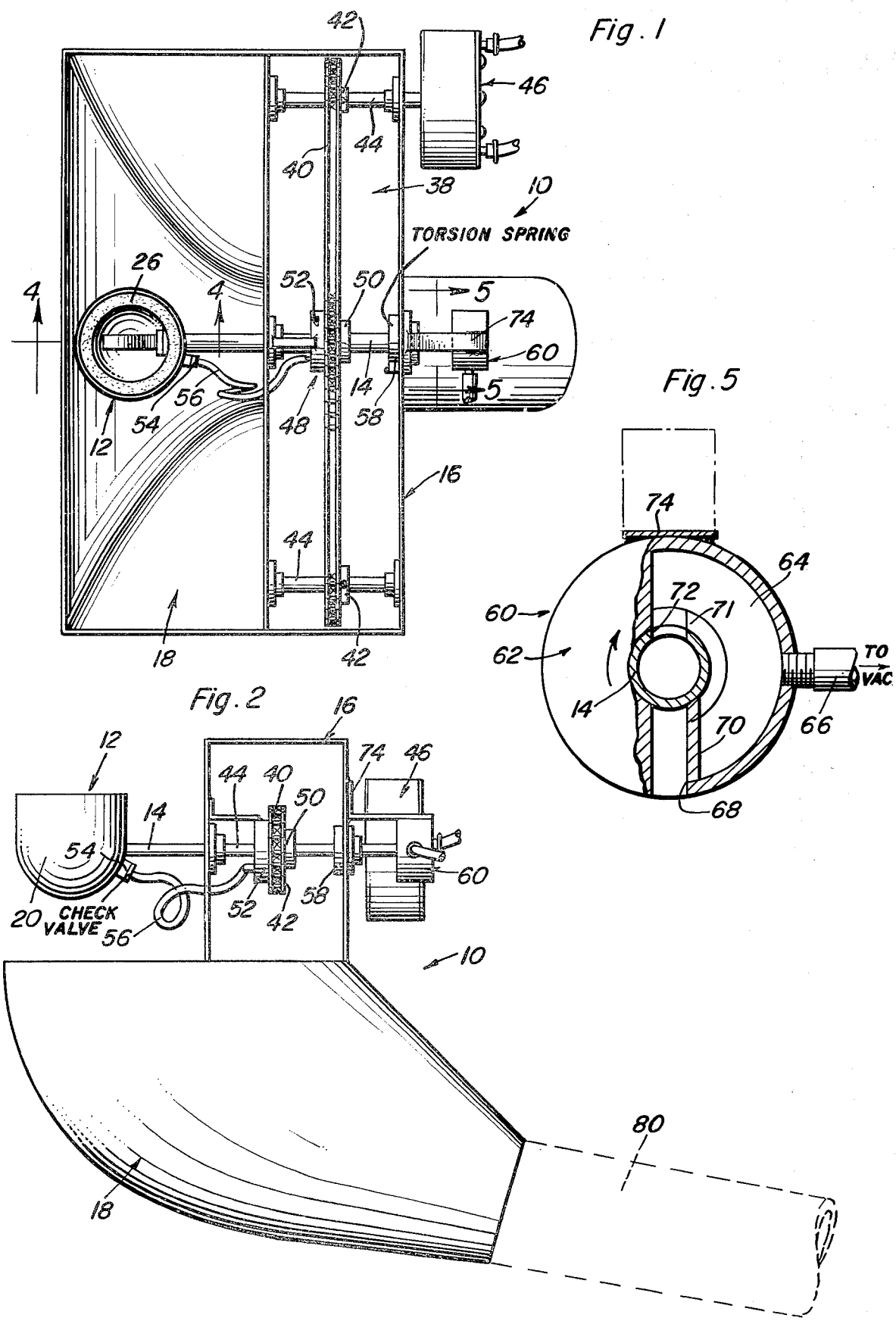

VACUUM OPERATED FRUIT PICKER

BACKGROUND OF THE INVENTION

1. Field of the Invention

This invention relates generally to a picker, and particularly to an automatic vacuum operated fruit picker capable of being completely automatic in its operation when mounted to a mechanical arm either individually or in special groupings.

2. Description of the Prior Art

In the picking of some citrus fruits such as Valencias there are present on the trees both small oranges and/or blossoms as well as the ripe fruit to be picked. It is imperative that these small oranges and blossoms be left unmolested while picking the ripe fruit.

It is known generally to pick citrus fruits, and the like, by use of a suction head which engages the fruit and grips same by means of the suction, rotates to sever the fruit from the tree, and the like, and interrupts the suction to drop the fruit into a gathering hopper, and the like. However, these known suction devices are not capable of solving the problem referred to above, since the small oranges and blossoms will be attracted to the suction head as well as the ripe fruit.

SUMMARY OF THE INVENTION

It is an object of the present invention to provide an automatic sensing device to apply vacuum to a picking head, automatically remove the fruit from its associated stem with a rotary pulling action, and subsequently depositing the fruit into a hopper communicating with a collection device.

It is another object of the present invention to permit fruit, and the like, to be readily removed from all areas of a tree regardless of the accessibility and thickness of growth around the fruit.

It is yet another object of the present invention to provide a vacuum operated picker head that will not be actuated by small fruit, blossoms, and the like.

It is still another object of the present invention to provide a vacuum operated picker in which all steps involved in the picking operation are automatically controlled by the vacuum.

These and other objects are achieved according to the present invention by providing a vacuum operated citrus picker head having: a housing provided with a void and an opening communicating with the void, the opening arranged for sealingly receiving at least a portion of an article; a conduit mounted on a wall of the housing and arranged communicating with the void for selectively creating a vacuum therein; and a flapper valve arranged in the void for normally blocking the conduit and for unblocking the conduit on being contacted by an article received in the opening and extending into the void.

According to a preferred embodiment of the present invention, the flapper valve has a valve element pivotally mounted on an end portion of the conduit extending into the void, and a flapper connected to the valve element for movement therewith and arranged for pivoting the valve element to a position unblocking the conduit when contacted by an article.

A vacuum operated clutch arrangement is advantageously associated with the conduit for selectively rotating same approximately 180° when a predetermined vacuum is created in the housing void. A preferred clutch arrangement has a continuously running chain and sprocket assembly, with the chain rotatably engaging one part of a vacuum-actuated clutch. The other part of the clutch is connected to the conduit for rotation therewith so as to selectively rotate same whenever the two clutch parts are caused to engage one another. A suitable spring, and the like, may be used to return the rotated conduit to its normal or rest position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, top plan view showing a vacuum operated picker according to the present invention.

FIG. 2 is a fragmentary, side elevational view showing the picker of FIG. 1.

FIG. 5 is a fragmentary, sectional view taken generally along the line 5—5 of FIG. 1, but drawn to a larger scale and partly cut away and in further section.

DESCRIPTION OF THE PREFERRED EMBODIMENTS

Figure 3:
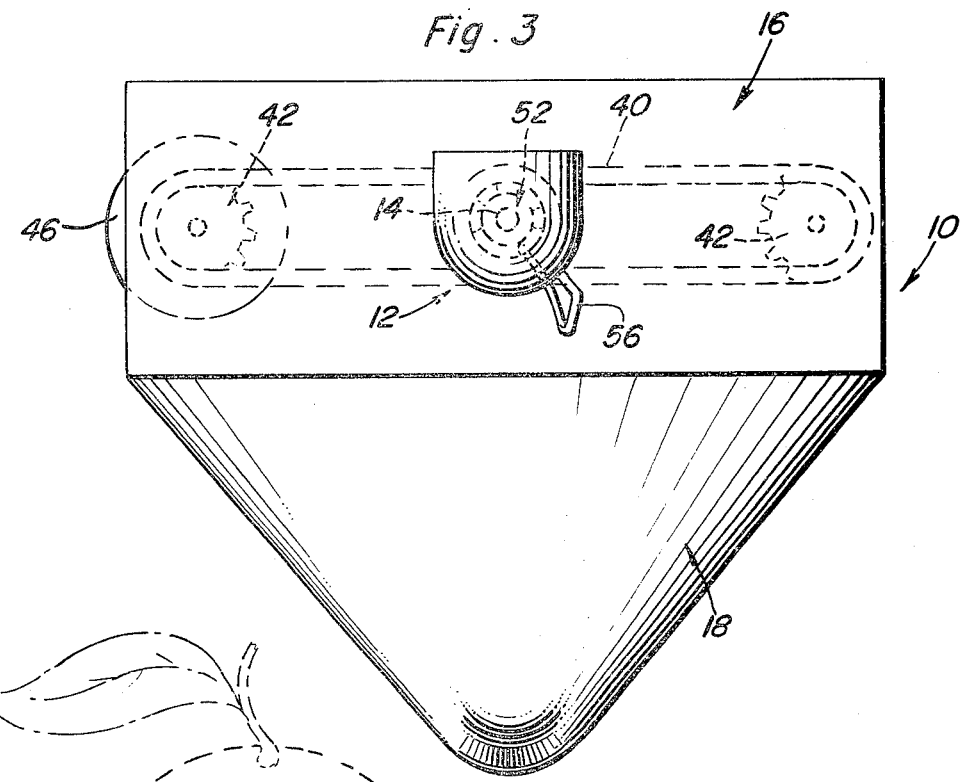
FIG. 3 is a partly schematic, front elevational view showing the picker of FIGS. 1 and 2.

Referring now more particularly to FIGS. 1 to 3 of the drawings, a vacuum operated citrus picker 10 according to the present invention has a picker head 12 rotatably mounted on a shaft 14 formed by a rigid piece of hollow conduit, and the like. Shaft 14 is conventionally journaled in a pair of spaced plates forming parts of a superstructure 16 arranged atop a gathering hopper 18. In this manner, movement of hopper 18 in a conventional manner (not shown) permits picker head 12 to be properly positioned, while the rotatable mounting of shaft 14 on superstructure 16 of the gathering hopper permits an operation to be described below.

Figure 4:
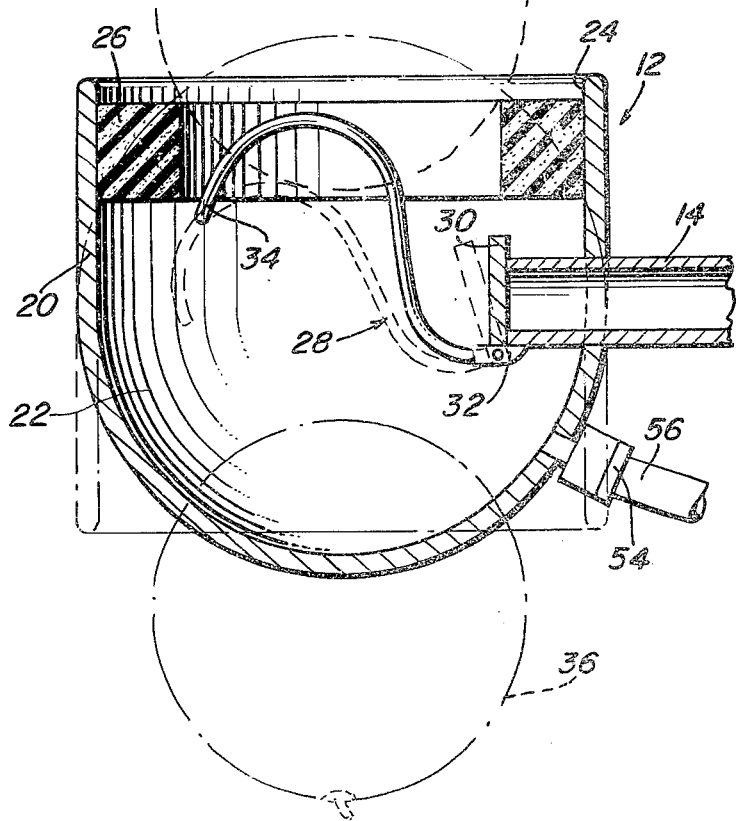
FIG. 4 is a fragmentary, sectional view taken generally along the line 4—4 of FIG. 1, but drawn to a larger scale.

FIG. 4 of the drawings shows in detail a picker head 12 according to the present invention. This picker head has a cup-shaped housing 20 provided with a void 22 and an opening 24 communicating with void 22. Housing 20 is provided with a seal 26 constructed from any suitable, preferably resilient sealing material, arranged in void 22 adjacent opening 24 for sealingly receiving at least a portion of an article to be picked. The conduit forming shaft 14 extends through an aperture provided in the wall defining housing 20, and is arranged communicating with void 22 for selectively creating a vacuum therein. A flapper valve 28 is arranged in void 22 in a manner to be described below for normally blocking the associated end of the conduit and for unblocking same on the valve being contacted by an article received in opening 24 so as to extend into void 22.

Valve 28 advantageously has a valve element 30 pivotally mounted on the end portion of the conduit forming shaft 14 which extends into void 22. This pivotal mounting may be achieved as by one or more lugs 32 affixed to the conduit and provided with an aperture arranged for receiving a pin or pins, and the like. The valve element has apertures which also receive any pins employed to achieve the pivotal mounting. A flapper 34, that advantageously has the illustrated question-mark configuration, is connected to valve element 30 for movement therewith and is arranged for pivoting element 30 to a position unblocking the associated end of the conduit when flapper 34 is contacted by an article 36, such as oranges, grapefruit, and the like.

Referring again to FIGS. 1 to 3 of the drawings, a vacuum operated clutch assembly 38 is arranged for selectively rotating picker head 12 so as to sever an engaged article 36 from a support associated therewith. In the case of citrus, and the like, this support would be the stem holding the piece of fruit on an associated tree. Assembly 38 has a conventional sprocket chain 40 arranged about a pair of spaced end sprockets 42, one of which sprockets is rotatably mounted on a shaft 44, while the other of the sprockets is mounted for rotation with an associated shaft 44. The latter shaft 44 is continuously rotated as by a suitable, known rotary fluid motor 46 connected to a suitable supply (not shown) of a working fluid under pressure. A vacuum actuated clutch 48 has a first clutch part 50 connected to shaft 14 for selectively rotating same, and a second clutch part 52 having a sprocket portion connected to chain 40. A check valve 54 connected to clutch 48 and housing 20 permits a predetermined vacuum in void 22 to operably connect clutch parts 50 and 52 together and cause the movement of chain 40 to rotate shaft 14 and housing 20. Valve 54 is connected to housing 20 and clutch 48 as by a suitable hose 56. A conventional torsion spring 58, and the like, is associated with shaft 14 for returning same to its normal or rest position following a rotation of the shaft by engagement of clutch parts 50 and 52.

As can best be seen in FIGS. 1 and 5 of the drawings, a vacuum supply discharge valve 60 is associated with the end portion of shaft 14 spaced longitudinally from picker head 12. This valve 60 has a housing 62 provided with a vacuum chamber 64 to which communicates an inlet vacuum fitting 66 itself connected to a conventional source of vacuum, such as the suction side of a pump. When the conduit forming the shaft is arranged in the rest position, port 72 in the shaft 14 is in communication with chamber 64 through the elongated port 71 in housing 62, thereby applying vacuum to valve element 30 on flapper valve 28. This position is that shown in FIGS. 1 to 3 of the drawings. As can readily be appreciated from FIG. 5 of the drawings as shaft 14 rotates from the normal or rest position illustrated in FIG. 5 of the drawings, vacuum is continuously applied to port 72 through the elongated port 71 until just prior to completion of the 180 degree turn of shaft 14. At this time port 72, and therefore shaft 14, will be blocked from chamber 64 by presence of portion 70 in the housing. Shaft 14 will then complete its 180 degree turn allowing port 72 to open into port 68 so as to vent void 22 to atmosphere and completely release the grip of picker head 12 on an article 36 previously engaged thereby. Housing 62 is advantageously mounted on superstructure 16 as by an L-shaped bracket 74 together with suitable fastening means, such as screw fasteners or welds.

When picker head 12 rotates and releases a previously gripped article 36, as shown by broken lines in FIG. 4 of the drawings, the released article 36 will fall into gathering hopper 18 and down a throat 76 thereof to a conventional collecting area (not shown).

In operation, when the picking arm senses a piece of ripe fruit, flapper 34 will be depressed to its broken line position in FIG. 4 of the drawings and valve element 30 pivoted to its broken line FIG. 4 position applying a vacuum to void 22. This vacuum is allowed to pull the article 36 close against the, for example, rubber seal 26, and after the vacuum has built up to a predetermined value, to open check valve 54 and cause clutch 48 to engage and rotate shaft and housing 20 approximately 180 degrees. When the article 36 is a piece of fruit, this rotation will cause the fruit to be severed from its associated stem. When housing 20 is rotated 180°, the construction of valve 60 will cause the vacuum in void 22 to be vented to, for example, the atmosphere and the vacuum in the void eliminated. The piece of fruit, and the like, will now drop out of housing 20 as by the force of gravity. The release of the article 36 causes any remaining vacuum in void 22 to be filled, and the vacuum on clutch 48 to be released. The disengagement of clutch 48 will permit the pressure of spring 58 to return shaft 14 and housing 20 to their normal or rest positions. The latter position is that shown in FIGS. 1 to 3 of the drawings. Picker head 12 is now ready to sense and grip another article. The whole cycle will complete itself in a matter of a few seconds, contributing to making picker head 12 very efficient.

Another advantage of a picker head 12 according to the present invention is its adaptability to all sizes of mature fruit. The picker cup is designed to accommodate the smallest commercial size fruit. That is, if housing 20 is designed to pick oranges, it will also adapt to grapefruit picking because the larger grapefruit will still be held against seal 26 by the vacuum in void 22 even though only a small spherical section of the fruit is in the cup formed by housing 20. The most important feature of the present invention is that small oranges, and the like, and any blossoms will not be heavy enough to actuate flapper 34 and open valve 28. Thus, the undersized articles will be passed over and left unmolested on the tree.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. A vacuum operated citrus picker, comprising, in combination:
 a. vacuum means for engaging a selected article and holding same firmly in place; and
 b. clutch means for selectively rotating the vacuum means and severing an engaged article from a support associated therewith, the vacuum means including valve means for placing a vacuum on an article on contact of the article with the valve means, the vacuum means further including a cup-shaped housing provided with a void and an opening communicating with the void, the opening arranged for receiving at least a portion of an article, a seal arranged around the opening, and a conduit mounted on a wall of the housing and arranged communicating with the void for selectively creating a vacuum therein, with the valve means being a flapper valve arranged in the void for being contacted by an arti- cle received in the opening and extending into the void, and pivotally mounted on the conduit and arranged for normally blocking the conduit and being pivoted to a position unblocking the conduit when contacted by an article.

2. A structure as defined in claim 1, wherein the vacuum means further includes a vacuum valve mounted on the conduit, and the clutch means includes a continuously running chain and sprocket assembly and a vacuum-actuated clutch having first and second clutch parts, the first clutch part being connected to the conduit for selectively rotating same and the second clutch part being connected to the chain and sprocket assembly, a check valve connected to the clutch and the housing for permitting a predetermined vacuum in the void to operably connect the clutch parts together will rotate the conduit, vacuum valve, and housing 180° from a rest position, and a spring means associated with the conduit for returning same to the rest position, the vacuum valve being arranged for removing the vacuum from the conduit and void when the same are 180° from the rest position and disengaging the clutch for permitting the spring means to return the conduit and housing to the rest position.

3. A structure as defined in claim 2, further including a gathering hopper, and wherein the conduit is rotatably mounted on the hopper.

4. A structure as defined in claim 1, further including a gathering hopper, and wherein the conduit is rotatably mounted on the hopper.

5. A vacuum operated citrus picker head, comprising, in combination:
   a. a housing provided with a void and an opening communicating with the void, the opening arranged for sealingly receiving at least a portion of an article;
   b. a conduit mounted in a wall of the housing and arranged communicating with the void for selectively creating a vacuum therein, and
   c. valve means arranged in the void for normally blocking the conduit and for unblocking the conduit on being contacted by an article received in the opening and extending into the void, the valve means being a flapper valve including a valve element pivotally mounted on an end portion of the conduit and extending into the void, and a flapper connected to the valve element for movement therewith and arranged for pivoting the valve element to a position unblocking the conduit when the flapper is contacted by an article.

6. A vacuum operated citrus picker, comprising, in combination:
   a. vacuum means for engaging a selected article and holding same firmly in place; and
   b. clutch means for selectively rotating the vacuum means and severing an engaged article from a support associated therewith, the vacuum means including valve means for placing a vacuum on an article on contact of the article with the valve means, the vacuum means further including a housing provided with a void and an opening communicating with the void, the opening arranged for sealingly receiving at least a portion of an article, and a conduit mounted on a wall of the housing and arranged communicating with the void for selectively creating a vacuum therein, with the valve means being a flapper valve arranged in the void for being contacted by an article received in the opening and extending into the void, and including a valve element pivotally mounted on the conduit and arranged for normally blocking the conduit and being pivoted to a position unblocking the conduit when contacted by an article.

* * * * *